United States Patent
Kim et al.

(10) Patent No.: US 10,403,898 B2
(45) Date of Patent: Sep. 3, 2019

(54) ELECTROLYTIC COPPER FOIL HAVING HIGH TENSILE STRENGTH, ELECTRODE INCLUDING THE SAME, SECONDARY BATTERY INCLUDING THE SAME, AND METHOD OF MANUFACTURING THE SAME

(71) Applicant: LS Mtron Ltd., Anyang-si, Gyeonggi-do (KR)

(72) Inventors: Seung Min Kim, Anyang-si (KR); Jeong Gil Lee, Anyang-si (KR); Shan Hua Jin, Anyang-si (KR)

(73) Assignee: KCF TECHNOLOGIES CO., LTD., Anyang-si, Gyeonggi-Do (KR)

( * ) Notice: Subject to any disclaimer, the term of this patent is extended or adjusted under 35 U.S.C. 154(b) by 247 days.

(21) Appl. No.: 15/661,266

(22) Filed: Jul. 27, 2017

(65) Prior Publication Data

US 2019/0036126 A1  Jan. 31, 2019

(51) Int. Cl.
| | |
|---|---|
| *H01M 4/66* | (2006.01) |
| *C25D 3/38* | (2006.01) |
| *C25D 5/08* | (2006.01) |
| *C25D 7/06* | (2006.01) |
| *C25D 1/04* | (2006.01) |
| *H01M 10/0525* | (2010.01) |

(52) U.S. Cl.
CPC ............. *H01M 4/661* (2013.01); *C25D 1/04* (2013.01); *C25D 3/38* (2013.01); *C25D 5/08* (2013.01); *C25D 7/0614* (2013.01); *H01M 10/0525* (2013.01)

(58) Field of Classification Search
CPC .......... H01M 4/661; C25D 1/04; C25D 3/38; C25D 5/08; C25D 7/0614
See application file for complete search history.

(56) References Cited

FOREIGN PATENT DOCUMENTS

| JP | 2016125120 A | 7/2016 |
| JP | 2016-537514 A1 | 12/2016 |
| WO | 2015/104999 A1 | 7/2015 |

OTHER PUBLICATIONS

Japanese Office Action for related Japanese Application No. 2017-145390; dated Oct. 23, 2018; (2 pages).
Japanese Office Action for related Japanese Application No. 2017-145390; action dated Jul. 2, 2019; (2 pages).

*Primary Examiner* — Helen Oi K Conley
(74) *Attorney, Agent, or Firm* — K&L Gates LLP

(57) ABSTRACT

A high strength electrolytic copper foil preventing generation of folds, wrinkles, pleats, and breaks during a roll-to-roll (RTR) process, a method of manufacturing the same, and an electrode and a secondary battery which allow high productivity to be secured by being manufactured with such an electrolytic copper foil. The electrolytic copper foil includes a copper film including 99 weight % or more of copper and a protective layer on the copper film, wherein the electrolytic copper foil has a tensile strength of 45 to 65 $kgf/mm^2$.

4 Claims, 1 Drawing Sheet

ELECTROLYTIC COPPER FOIL HAVING HIGH TENSILE STRENGTH, ELECTRODE INCLUDING THE SAME, SECONDARY BATTERY INCLUDING THE SAME, AND METHOD OF MANUFACTURING THE SAME

BACKGROUND

1. Field of the Invention

The present invention relates to an electrolytic copper foil having high tensile strength, an electrode including the same, a secondary battery including the same, and a method of manufacturing the same.

2. Description of Related Art

Electrolytic copper foils are used in a process of manufacturing various products such as a negative electrode current collector of a secondary battery, a flexible printed circuit board (FPCB), etc.

Generally, electrolytic copper foils are manufactured using a roll-to-roll (RTR) process, and are also used in a process of manufacturing a negative electrode current collector of a secondary battery, an FPCB, or the like using the RTR process An RTR process is known as a suitable process for mass production of products because the RTR process is capable of continuous production. However, because folds, wrinkles and/or pleats of an electrolytic copper foil actually occur in the RTR process, equipment for an RTR process has to be stopped, and restarted after such problems are solved, thereby causing a serious problem in which productivity is lowered because such process equipment is stopped and restarted repeatedly.

That is, inherent advantages of the RTR process are undermined because continuous production is impossible due to folds, wrinkles and pleats of an electrolytic copper foil occurring in the RTR process, thereby causing lowered productivity of products.

SUMMARY OF THE INVENTION

The present invention is directed to providing an electrolytic copper foil capable of preventing problems caused by limits and disadvantages of the above related art, an electrode including the same, a secondary battery including the same, and a method of manufacturing the same.

The present invention is also directed to providing an electrolytic copper foil having high tensile strength capable of preventing generation of folds, wrinkles, pleats, or breaks thereof during a roll-to-roll (RTR) process.

The present invention is also directed to providing an electrode capable of securing high productivity by being manufactured with a high strength electrolytic copper foil preventing generation of folds, wrinkles, pleats, or breaks during a RTR process.

The present invention is also directed to providing a secondary battery capable of securing high productivity by being manufactured with a high strength electrolytic copper foil preventing generation of folds, pleats, wrinkles, or breaks during a RTR process.

The present invention is also directed to providing a method of manufacturing a high strength electrolytic copper foil having high tensile strength capable of preventing generation of folds, wrinkles, pleats, or breaks of a copper foil during a RTR process.

Besides the above-mentioned aspects of the present invention, other features and advantages of the present invention will be described in the following descriptions or may be clearly understood by those skilled in the art from the descriptions.

According to an aspect of the present invention, there is provided an electrolytic copper foil including a copper film having 99 weight % or more of copper, and a protective layer on the copper film, wherein the electrolytic copper foil has a tensile strength of 45 to 65 kgf/mm$^2$.

According to another aspect of the present invention, there is provided an electrode for a secondary battery, including an electrolytic copper foil including a copper film having 99 weight % or more of copper and a protective layer on the copper film, wherein the electrolytic copper foil has a tensile strength of 45 to 65 kgf/mm$^2$, and an active material layer on the electrolytic copper foil, wherein the active material layer includes one or more active materials selected from a group consisting of carbon, a metal (Me) such as Si, Ge, Sn, Li, Zn, Mg, Cd, Ce, Ni, or Fe, an alloy including the metal (Me), a metal oxide (MeO$_x$) of the metal (Me), and a composite of the metal (Me) and carbon.

According to still another aspect of the present invention, there is provided a secondary battery including a positive electrode (cathode), a negative electrode (anode), an electrolyte configured to provide a condition which allows lithium ions to move between the positive electrode and the negative electrode, and a separator configured to electrically insulate the positive electrode and the negative electrode from each other, wherein the negative electrode includes an electrolytic copper foil including a copper film having 99 weight % or more of copper and a protective layer on the copper film, wherein the electrolytic copper foil has a tensile strength of 45 to 65 kgf/mm$^2$, and an active material layer on the electrolytic copper foil, and the active material layer includes one or more active materials selected from a group consisting of carbon, a metal (Me) such as Si, Ge, Sn, Li, Zn, Mg, Cd, Ce, Ni, or Fe, an alloy including the metal (Me), a metal oxide (MeO$_x$) of the metal (Me), and a composite of the metal (Me) and carbon.

According to yet another aspect of the present invention, there is provided a method of manufacturing an electrolytic copper foil, including applying electricity between a positive electrode plate and a rotating negative electrode drum which are disposed in an electrolyte to be spaced apart from each other in an electrolytic bath to form a copper film on the rotating negative electrode drum, wherein the electrolyte includes in a range of 50 to 100 g/L of copper ions, 50 to 150 g/L of sulfuric acid, 0.5 to 6.5 ppm of imidazolidine-2-thione, and 0.2 to 5.5 ppm of silver (Ag).

The electrolyte may further include in a range of 3 to 7 ppm of sulfonate and 3 to 7 ppm of polymeric nitride.

The electrolyte may be maintained at 40 to 60° C., and a current density provided by the positive electrode plate may be in a range of 40 to 80 A/dm$^2$.

In the forming of the copper film, a flow rate of the electrolyte supplied into the electrolytic bath may be in a range of 30 to 50 m$^3$/hour.

A content of total organic carbon (TOC) in the electrolyte may be maintained to be 0.3 g/L or less.

The method of the present invention may further include dipping the copper film in an anticorrosion solution.

The above general descriptions of the present invention are merely intended to be illustrative of or explaining the present invention, and are not intended to limit the scope of the present invention.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings.

It should be apparent to those skilled in the art that various changes and modifications may be made in the present invention without departing from the spirit and scope of the present invention. Therefore, the present invention includes all changes and modifications that come within the scope of the present invention as defined in the appended claims and their equivalents.

Figure 1:
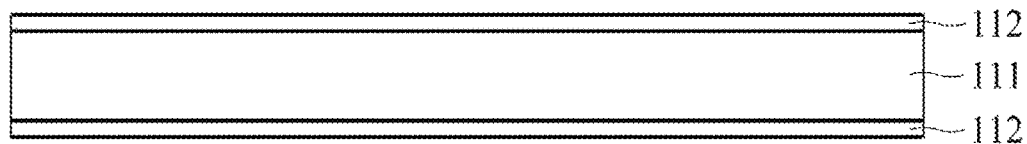
FIG. 1 is a cross-sectional view illustrating an electrolytic copper foil according to one embodiment of the present invention.

FIG. 1 is a cross-sectional view illustrating an electrolytic copper foil 110 according to one embodiment of the present invention.

In the embodiment shown in FIG. 1, the electrolytic copper foil 110 of the present invention includes a copper film 111 including 99 weight % or more of copper and protective layers 112 on the copper film 111. Although the protective layers 112 are formed on both surfaces of the copper film 111 in the electrolytic copper foil 110 shown in FIG. 1, the present invention is not limited thereto, and the protective layer 112 may be formed on only one surface of the copper film 111.

The electrolytic copper foil 110 according to one embodiment of the present invention has a thickness of 4 to 35 μm. When the electrolytic copper foil 110 has a thickness of less than 4 μm, workability of manufacturing an electrode or a secondary battery is lowered. On the other hand, when a secondary battery is manufactured with the electrolytic copper foil 110 having a thickness of greater than 35 μm, implementation of high capacity is difficult due to the thickness of the electrolytic copper foil 110.

The copper film 111 may be formed on a rotating negative electrode drum using an electroplating process and have a shiny surface contacting with the rotating negative electrode drum during the electroplating process and a matte surface opposite the shiny surface.

The protective layer 112 may be formed by coating or electroplating the copper film 111 with an anticorrosion material. The anticorrosion material may include at least one of chromate, benzotriazole (BTA), and a silane compound. The protective layer 112 prevents oxidation and corrosion of the copper film 111 and improves heat resistance thereof, thereby increasing a lifetime of a finished product including the electrolytic copper foil 110 as well as a lifetime of the electrolytic copper foil 110.

In order to suppress folds and windings (i.e., pleats or wrinkles) of the electrolytic copper foil 110, the electrolytic copper foil 110 of the present invention has a high tensile strength of 45 kgf/mm$^2$ or more. When the tensile strength of the electrolytic copper foil 110 is less than 45 kgf/mm$^2$, a roll-to-roll (RTR) manufacturing process causes folds of the electrolytic copper foil 110 between two adjacent rolls or causes pleats or wrinkles of lateral end portions of the electrolytic copper foil 110.

On the other hand, when the tensile strength of the electrolytic copper foil 110 is greater than 65 kgf/mm$^2$, the electrolytic copper foil 110 has an excessively low elongation of less than 3%, and thus there is a risk of breaks of the electrolytic copper foil 110 being caused during a process of manufacturing a finished product such as a negative electrode current collector of a secondary battery, a flexible printed circuit board (FPCB), etc. Accordingly, the electrolytic copper foil 110 of the present invention preferably has a tensile strength of 45 to 65 kgf/mm$^2$ and an elongation of 3 to 13%.

Hereinafter, an example in which the electrolytic copper foil 110 of the present invention is used in a process of manufacturing a secondary battery will be described in detail only for convenience of explanation. However, as described above, the electrolytic copper foil 110 of the present invention may be similarly used for various other products manufactured by an RTR process using a copper foil, e.g., used in a process of manufacturing a FPCB.

A lithium secondary battery includes a positive electrode (cathode), a negative electrode (anode), an electrolyte providing a condition which allows lithium ions to move between the positive electrode and the negative electrode, and a separator configured to electrically insulate the positive electrode and the negative electrode from each other in order to prevent electrons generated in one electrode from being wastefully consumed by moving to the other electrode through an inside of the lithium secondary battery.

Figure 2:
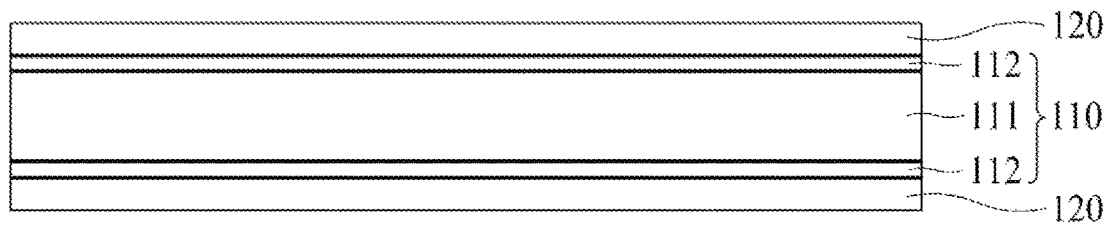
FIG. 2 is a cross-sectional view illustrating an electrode for a secondary battery according to one embodiment of the present invention.

FIG. 2 is a cross-sectional view illustrating an electrode for a secondary battery according to one embodiment of the present invention.

In the embodiment shown in FIG. 2, an electrode 100 for a secondary battery according to one embodiment of the present invention includes a electrolytic copper foil 110 according to any one of the above-described embodiments of the present invention, and active material layers 120.

Although the active material layers 120 are formed on both surfaces of the electrolytic copper foil 110 shown in FIG. 2, the present invention is not limited thereto, and the active material layer 120 may be formed on only one surface of the electrolytic copper foil 110.

In a lithium secondary battery, an aluminum foil is generally used as a positive electrode current collector coupled to a positive electrode active material, and the electrolytic copper foil 110 is generally used as a negative electrode current collector coupled to a negative electrode active material.

According to one embodiment of the present invention, the electrode 100 for a secondary battery is a negative electrode, the electrolytic copper foil 110 is used as a negative electrode current collector, and the active material layer 120 includes a negative electrode active material.

The active material layer 120 includes one or more active materials selected from a group consisting of carbon, a metal (Me) such as Si, Ge, Sn, Li, Zn, Mg, Cd, Ce, Ni, or Fe, an alloy including the metal (Me), a metal oxide (MeO$_x$) of the metal (Me), and a composite of the metal (Me) and carbon as the negative electrode active material.

In order to increase a charge and discharge capacity of the secondary battery, the active material layer 120 may be formed with a mixture of negative electrode active materials including a predetermined amount of Si.

Meanwhile, as the secondary battery is repeatedly charged and discharged, the active material layer 120 alternately shrinks and expands, thereby causing separation of the active material layer 120 and the electrolytic copper foil 110 and lowering charge and discharge efficiency of the secondary battery. Accordingly, in order to secure a capacity retention rate and a lifetime of the secondary battery to be predetermined levels or higher (i.e., in order to suppress a decrease in the charge and discharge efficiency of the secondary battery), the electrolytic copper foil 110 has to have excellent coating properties with respect to the active material so as to have high adhesive strength between the electrolytic copper foil 110 and the active material layer 120.

From a macroscopic point of view, in general, the smaller a ten point average roughness ($R_z$ JIS) of a surface of the electrolytic copper foil 110 is, the lower the decrease in the charge and discharge efficiency of the secondary battery is.

Accordingly, the surface of the electrolytic copper foil 110 according to one embodiment of the present invention has a ten point average roughness ($R_z$ JIS) of 3.5 µm or less. When the surface of the electrolytic copper foil 110 has a ten point average roughness ($R_z$ JIS) of greater than 3.5 µm, contact uniformity of the electrolytic copper foil 110 and the active material layer 120 may be lower than a predetermined level, and thus the secondary battery may not satisfy a capacity retention rate of 90% or more which is an industry requirement.

Hereinafter, a method of manufacturing the electrolytic copper foil 110 of the present invention will be described in detail with reference to FIG. 3.

The method of the present invention includes forming a copper film 111 on a rotating negative electrode drum 40 by applying electricity between a positive electrode plate 30 and the rotating negative electrode drum 40 which are disposed to be spaced apart from each other in an electrolyte 20 in an electrolytic bath 10.

Figure 3:
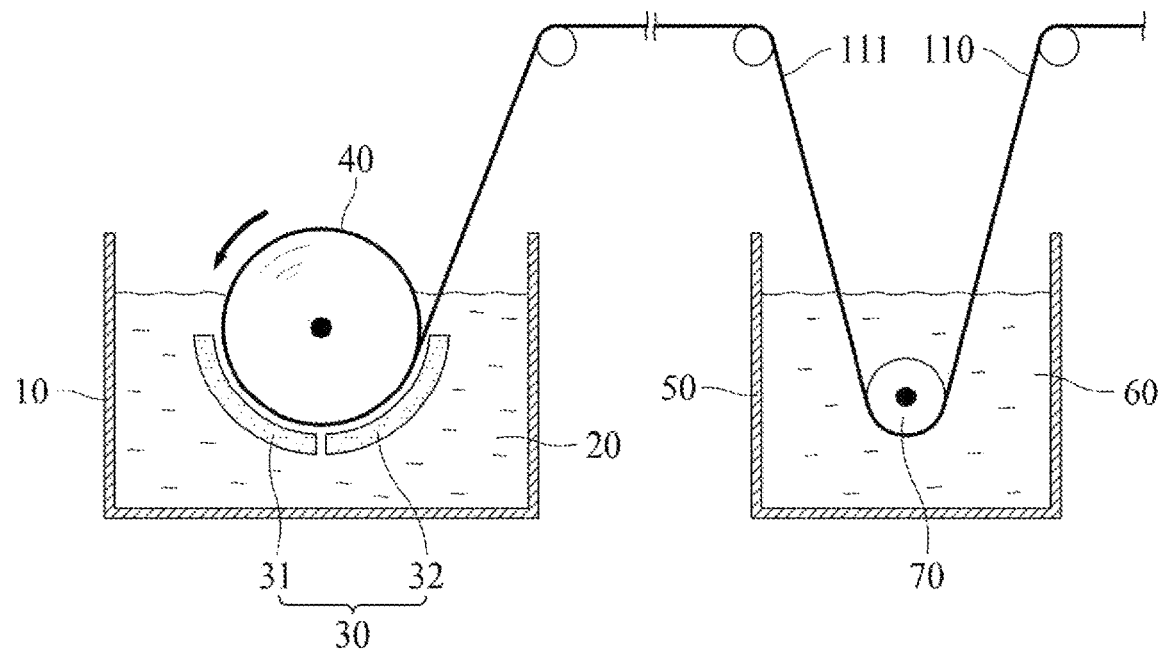
FIG. 3 is a view of manufacturing an electrolytic copper foil using an equipment for manufacturing an electrolytic copper foil according to one embodiment of the present invention.

In the embodiment shown in FIG. 3, the positive electrode plate 30 may include a first positive electrode plate 31 and a second positive electrode plate 32 which are electrically insulated from each other.

The forming of the copper film 111 may include forming a seed layer by electrically connecting the first positive electrode plate 31 and the rotating negative electrode drum 40, and then growing the seed layer by electrically connecting the second positive electrode plate 32 and the rotating negative electrode drum 40.

A current density provided by each of the first and second positive electrode plates 31 and 32 may be in a range of 40 to 80 A/dm$^2$.

According to one embodiment of the present invention, the current density provided by the first positive electrode plate 31 is set to be higher than the current density provided by the second positive electrode plate 32 (i.e., a relatively high current density is applied in the forming of the seed layer), and thus a grain size of the seed layer is decreased. Therefore, grain sizes of a shiny surface and a matte surface of the copper film 111 may be formed to be the same or similar.

Since the shiny surface and the matte surface of the copper film 111 have the same or similar grain sizes, folds or windings of the electrolytic copper foil 110 of the present invention can further be suppressed.

According to the present invention, the electrolyte 20 includes in a range of 50 to 100 g/L of copper ions, 50 to 150 g/L of sulfuric acid, 0.5 to 6.5 ppm of imidazolidine-2-thione, and 0.2 to 5.5 ppm of silver (Ag).

When the content of imidazolidine-2-thione is less than 0.5 ppm or the content of silver (Ag) is greater than 5.5 ppm, a tensile strength of the electrolytic copper foil 110 is less than 45 kgf/mm$^2$, thereby increasing a risk of folds or windings (i.e., wrinkles or pleats) being caused when a finished product is manufactured with the electrolytic copper foil 110 through an RTR process.

When the content of imidazolidine-2-thione is greater than 6.5 ppm or the content of silver (Ag) is less than 0.2 ppm, the tensile strength of the electrolytic copper foil 110 is greater than 65 kgf/mm$^2$ and an elongation thereof is also less than 3% which is excessively low, and thus there is a risk of breaks of the electrolytic copper foil 110 being caused during a process of manufacturing a finished product such as a negative electrode current collector of a secondary battery, a FPCB, etc.

The electrolyte may further include in a range of 3 to 7 ppm of sulfonate (e.g., sodium polystyrene sulfonate (SPS)) and 3 to 7 ppm of polymeric nitride (e.g., collagen).

The electrolyte 20 is maintained at 40 to 60° C., and a current density provided by the positive electrode plate 30 may be in a range of 40 to 80 A/dm$^2$. In the forming of the copper film 111, a flow rate of the electrolyte 20 supplied into the electrolytic bath 10 may be in a range of 30 to 50 m$^3$/hour.

In the forming of the copper film 111, a content of total organic carbon (TOC) in the electrolyte 20 is preferably maintained to be 0.3 g/L or less. When the content of TOC is greater than 0.3 g/L, grain growth of the copper film 111 may not be suppressed because an organic material is adsorbed on an active site of copper plating crystal growth, and thus the electrolytic copper foil 110 having a high tensile strength of 45 kgf/mm$^2$ or more cannot be manufactured.

A ten point average roughness ($R_z$ JIS) of the shiny surface of the copper film 111 is affected by a surface of the rotating negative electrode drum 40. According to one embodiment of the present invention, the surface of the rotating negative electrode drum 40 may be polished using a grinding brush having a grit of #800 to #1500.

The method of the present invention may further include dipping the copper film 111 in an anticorrosion solution 60. In the dipping of the copper film 111 in the anticorrosion solution 60, the copper film 111 may be guided by a guide roll 70 disposed in the anticorrosion solution 60.

As described above, the anticorrosion solution 60 may include chromate, BTA, and/or a silane compound. For example, the copper film 111 may be dipped in a dichromic acid potassium solution in a range of 1 to 10 g/L at room temperature for 2 to 20 seconds.

The electrode for a secondary battery of the present invention (i.e., the negative electrode) may be manufactured by coating one surface or both surfaces of the electrolytic copper foil 110 of the present invention, which is manufactured through the above method, with one or more negative active materials selected from a group consisting of carbon, a metal (Me) such as Si, Ge, Sn, Li, Zn, Mg, Cd, Ce, Ni, or Fe, an alloy including the metal (Me), a metal oxide (MeO$_x$) of the metal (Me), and a composite of the metal (Me) and carbon.

For example, 100 parts by weight of carbon for a negative electrode active material is mixed with 1 to 3 parts by weight of stylenebutadiene rubber (SBR) and 1 to 3 parts by weight of carboxylmethyle cellulose (CMC), and then a slurry is prepared using distilled water which serves as a solvent. Subsequently, the electrolytic copper foil 110 is coated with the slurry to have a thickness of 20 to 60 μm using a doctor blade, and a pressure of 0.5 to 1.5 ton/cm$^2$ is pressed thereon at 110 to 130° C.

A lithium secondary battery may be manufactured using the electrode for a secondary battery (the negative electrode) of the present invention, which is manufactured by the above method, with a general positive electrode, an electrolyte, and a separator.

Hereinafter, the present invention will be described in detail with reference to examples and comparative examples. However, it should be understood that the following examples are only for facilitating the understanding of the present invention, and the scope of the present invention is not limited to the examples.

Example 1

A copper film was formed on a rotating negative electrode drum by applying electricity between a positive electrode plate and a rotating negative electrode drum disposed to be spaced apart from each other in an electrolyte in an electrolytic bath. The electrolyte included 85 g/L of copper ions, 98 g/L of sulfuric acid, 5.6 ppm of SPS, 6.2 ppm of collagen, 0.6 ppm of imidazolidine-2-thione (IT), and 0.3 ppm of silver (Ag). In a process of forming the copper film, the electrolyte was maintained at about 50° C. A flow rate of the electrolyte supplied into the electrolytic bath was 40 m$^3$/hour. A current density applied to form the copper film was 55 A/dm$^2$. An electrolytic copper foil having a thickness of 4 μm was made by dipping the copper film in a 5 g/L dichromic acid potassium solution at room temperature for 10 seconds and performing a dry process on the copper film in order to form protective layers on both surfaces of the copper film.

Example 2

An electrolytic copper foil was manufactured using the same method as Example 1 except that a content of IT and a content of Ag in the electrolyte were 0.7 ppm and 5.5 ppm, respectively.

Example 3

An electrolytic copper foil was manufactured using the same method as Example 1 except that a content of IT and a content of Ag in the electrolyte were 6.4 ppm and 0.4 ppm, respectively.

Example 4

An electrolytic copper foil was manufactured using the same method as Example 1 except that a content of IT and a content of Ag in the electrolyte were 6.4 ppm and 5.4 ppm, respectively.

Comparative Example 1

An electrolytic copper foil was manufactured using the same method as Example 1 except that a content of IT and a content of Ag in the electrolyte were 0.4 ppm and 0.4 ppm, respectively.

Comparative Example 2

An electrolytic copper foil was manufactured using the same method as Example 1 except that a content of IT and a content of Ag in the electrolyte were 6.7 ppm and 5.3 ppm, respectively.

Comparative Example 3

An electrolytic copper foil was manufactured using the same method as Example 1 except that a content of IT and a content of Ag in the electrolyte were 0.3 ppm and 5.6 ppm, respectively.

Comparative Example 4

An electrolytic copper foil was manufactured using the same method as Example 1 except that a content of IT and a content of Ag in the electrolyte were 6.4 ppm and 6.5 ppm, respectively.

A tensile strength and an elongation of each of the electrolytic copper foils shown in the above examples and comparative examples were measured, and the measured results are shown in Table 1.

Tensile Strength and Elongation of Electrolytic Copper Foil

The tensile strength and elongation of each of the electrolytic copper foils were measured using a method specified in a test method manual of IPC-TM-650.

Whether Pleats or Breaks Occurred

Whether pleats (wrinkles) or breaks occurred was observed during a process of manufacturing a electrode for a secondary battery using the electrolytic copper foil and an RTR process.

TABLE 1

| | Electrolyte | | | | | | Electrolytic copper foil | | Whether pleat or break occurred |
|---|---|---|---|---|---|---|---|---|---|
| | Cu (g/L) | Sulfuric acid (g/L) | SPS (ppm) | Collagen (ppm) | IT (ppm) | Ag (ppm) | Tensile strength (kgf/mm$^2$) | Elongation (%) | |
| Example 1 | 85 | 98 | 5.6 | 6.2 | 0.6 | 0.3 | 51.5 | 8 | X |
| Example 2 | 85 | 98 | 5.6 | 6.2 | 0.7 | 5.5 | 45.6 | 12 | X |
| Example 3 | 85 | 98 | 5.6 | 6.2 | 6.4 | 0.4 | 64.8 | 4 | X |
| Example 4 | 85 | 98 | 5.6 | 6.2 | 6.4 | 5.4 | 53.5 | 7 | X |
| Comparative example 1 | 85 | 98 | 5.6 | 6.2 | 0.4 | 0.4 | 44.2 | 14 | ○ |
| Comparative example 2 | 85 | 98 | 5.6 | 6.2 | 6.7 | 1.3 | 67.7 | 2 | ○ |
| Comparative example 3 | 85 | 98 | 5.6 | 6.2 | 0.3 | 5.6 | 35.8 | 19 | ○ |

TABLE 1-continued

| | Electrolyte | | | | | | Electrolytic copper foil | | Whether pleat or break occurred |
|---|---|---|---|---|---|---|---|---|---|
| | Cu (g/L) | Sulfuric acid (g/L) | SPS (ppm) | Collagen (ppm) | IT (ppm) | Ag (ppm) | Tensile strength (kgf/mm$^2$) | Elongation (%) | |
| Comparative example 4 | 85 | 98 | 5.6 | 6.2 | 6.4 | 6.5 | 38.4 | 17 | ○ |

As shown in Table 1, when the content of IT was less than 0.5 ppm (Comparative example 1) or the content of silver (Ag) was greater than 5.5 ppm (Comparative examples 3 and 4), the electrolytic copper foil had a tensile strength of less than 45 kgf/mm$^2$ and an elongation of greater than 13%, and thus pleats (wrinkles) occurred during the RTR process.

In addition, when the content of IT was greater than 6.5 ppm (Comparative example 2), the electrolytic copper foil had a tensile strength of greater than 65 kgf/mm$^2$ and an elongation of less than 3%, and thus breaks occurred during the RTR process.

According to the present invention, an electrolytic copper foil having high tensile strength capable of preventing generation of folds, wrinkles, pleats, or breaks thereof during a roll-to-roll (RTR) process may be manufactured, and electronic components and final products such as FPCB and secondary battery using the electrolytic copper foil may be manufactured with high productivity.

It should be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of manufacturing an electrolytic copper foil, comprising:
   applying electricity between a positive electrode plate and a rotating negative electrode drum which are disposed in an electrolyte to be spaced apart from each other in an electrolytic bath to form a copper film on the rotating negative electrode drum,
   wherein the electrolyte includes in a range of 50 to 100 g/L of copper ions, 50 to 150 g/L of sulfuric acid, 0.5 to 6.5 ppm of imidazolidine-2-thione, and 0.2 to 5.5 ppm of silver (Ag).

2. The method of claim 1, wherein the electrolyte further includes in a range of 3 to 7 ppm of sulfonate and 3 to 7 ppm of polymeric nitride.

3. The method of claim 1, wherein:
   the electrolyte is maintained at 40 to 60° C.; and
   a current density provided by the positive electrode plate is in a range of 40 to 80 A/dm$^2$.

4. The method of claim 1, wherein, in the forming of the copper film, a flow rate of the electrolyte supplied into the electrolytic bath is in a range of 30 to 50 m$^3$/hour, and a content of total organic carbon (TOC) in the electrolyte is maintained to be 0.3 g/L or less.

* * * * *